(12) United States Patent
Abe

(10) Patent No.: US 7,732,371 B2
(45) Date of Patent: Jun. 8, 2010

(54) LIQUID-ABSORBING BASE

(75) Inventor: Satoru Abe, Chiba (JP)

(73) Assignee: Nippon Soda Co., Ltd., Tokyo (JP)

( * ) Notice: Subject to any disclaimer, the term of this patent is extended or adjusted under 35 U.S.C. 154(b) by 0 days.

(21) Appl. No.: 12/160,636

(22) PCT Filed: Jan. 17, 2007

(86) PCT No.: PCT/JP2007/050602

§ 371 (c)(1),
(2), (4) Date: Jul. 30, 2008

(65) Prior Publication Data

US 2009/0023584 A1    Jan. 22, 2009

(30) Foreign Application Priority Data

Jan. 17, 2006  (JP)  .............................. 2006-009310
Oct. 2, 2006   (JP)  .............................. 2006-270438

(51) Int. Cl.
  *B01J 20/26*  (2006.01)
  *B01J 20/00*  (2006.01)
  *B01J 20/10*  (2006.01)

(52) U.S. Cl. .................. 502/402; 502/400; 502/407

(58) Field of Classification Search ................. 502/400, 502/402, 407
See application file for complete search history.

(56) References Cited

U.S. PATENT DOCUMENTS

| | | | |
|---|---|---|---|
| 6,275,728 B1 | 8/2001 | Venkatraman et al. | |
| 2002/0123209 A1 | 9/2002 | Yamada et al. | |
| 2004/0150331 A1* | 8/2004 | Okubo et al. | 313/506 |
| 2006/0251687 A1* | 11/2006 | Lapidot et al. | 424/401 |

FOREIGN PATENT DOCUMENTS

| | | | |
|---|---|---|---|
| JP | 07-309972 | | 11/1995 |
| JP | 10-316590 | | 12/1998 |
| JP | 2000-044880 | | 2/2000 |
| JP | 2001-120669 | | 5/2001 |
| JP | 2003-040802 | | 2/2003 |
| JP | 2004-155806 | | 6/2004 |
| JP | 2004-224958 | * | 8/2004 |
| JP | 2005-179253 | | 7/2005 |
| JP | 2005-194200 | | 7/2005 |
| JP | 2005-272756 | * | 10/2005 |
| JP | 2005-330415 | * | 12/2005 |
| WO | WO 2004/081222 | * | 9/2004 |

OTHER PUBLICATIONS

Organic-Inorganic Hybrid Material, Technical Information Institute Co. Ltd., 2000, pp. 329-334.
S. Yano, Preparation and characterization of hydroxpropyl cellulose / silica micro-hybrids, Polymer vol. 35, No. 25, 1994, pp. 5565-5570.
Dec. 10, 2009 Supplementary European Search Report issued in EP 07706909.4-1214.
Yano, "Preparation and Characterization of Hydroxypropyl Cellulose/Silica Micro-Hybrids", Polymer, vol. 35, No. 25, pp. 5565-5570, 1994.

* cited by examiner

*Primary Examiner*—Timothy C Vanoy
*Assistant Examiner*—Daniel Berns
(74) *Attorney, Agent, or Firm*—Oliff & Berridge. PLC

(57) ABSTRACT

The object of the present invention is to provide a more practical liquid-absorbing substrate capable of absorbing not only water but also alcohols, wherein liquid absorbency and gel properties of the substrate can be easily controlled.
Namely, the present invention relates to a liquid-absorbing substrate containing:
(A) a product obtained by hydrolysis and polycondensation of a compound represented by the formula (I)

$$(R^1)_n M(X)_{m-n} \tag{I}$$

(wherein, $R^1$ represents a hydrogen atom, $C_1$-$C_6$ alkyl, or $C_2$-$C_6$ alkenyl; M represents a metal atom; X represents a hydrolyzable group; m represents the atomic valence of M; and n represents an integer of 0 or 1) in a solvent in the presence of a catalyst; and
(B) a cellulose derivative having a mass-average molecular weight of $1\times10^5$ to $5\times10^6$.

9 Claims, No Drawings

LIQUID-ABSORBING BASE

CROSS REFERENCE TO PRIOR RELATED APPLICATIONS

This application is a United States national phase application under 35 U.S.C. §371 of International Patent Application No. PCT/JP2007/050602, filed on Jan. 17, 2007, and claims the benefit of Japanese Patent Application No. 2006-009310, filed on Jan. 17, 2006, and of Japanese Patent Application No. 2006-270438, filed on Oct. 2, 2006, all of which are incorporated by reference herein. The International Application was published in Japanese on Jul. 26, 2007, as International Publication No. WO 2007/083664 A1 under PCT Article 21(2).

FIELD OF THE INVENTION

The present invention relates to a liquid-absorbing substrate capable of absorbing liquids such as water and alcohol.

BACKGROUND OF THE INVENTION

Recently, water-absorbing materials have been widely used in various fields including baby diapers, adult diapers, hygiene products such as sanitary products, and agricultural/gardening supplies. For example, Japanese Laid-Open Patent Application No. 2004-155806 describes an absorbent substrate in which cellulose ether is cross-linked via polyglycidyl ether.

Further, Japanese Laid-Open Patent Application No. 2005-179253 ("JP '253") describes a gel sheet containing a low-substituted cellulose ether having a molar substitution of 0.05 to 1.0, aqueous cellulose ether having a molar substitution of 1.1 to 1.4, and water. JP '253 describes that this sheet is a gel sheet having adequate strength and elasticity while containing much water, and having further improved feel and adherence to the skin.

Further, Japanese Laid-Open Patent Application No. 2005-194200 ("JP '200") describes cosmetics containing a self-cross-linked alkyl cellulose derivative hydrogel as a substrate, wherein the cosmetics have excellent stability, safety, biodegradability, as well as excellent sense of use, appearance, etc. In JP '200, alkyl cellulose is cross-linked by radiation to form a hydrogel.

On the other hand, also known are compositions containing a water-absorbing polymer (such as hydroxypropyl cellulose) and a water-absorbing silica gel.

For example, Organic-Inorganic Hybrid Material, Technical Information Institute Co. Ltd, 2000, pp. 329-334 describes a hydrogel using a hybrid of polyvinyl alcohol and $SiO_2$. This document describes that the degree of swelling (evaluated according to the length change of a piece of the specimens) and the tensile stress of the resultant hydrogel change according to the amount of tetraethoxysilane (amount of $SiO_2$). Water absorbency of this hybrid, however, is not as high as that of hydroxypropyl cellulose. This hybrid also does not have liquid absorbency for ethanol.

Furthermore, U.S. Pat. No. 6,275,728 describes use of films containing a water-absorbing polymer as a substrate for iontophoresis which allows transdermal absorption of a drug by electric current. Although a film containing hydroxypropyl cellulose and silica gel is described as an example in the patent, the molecular weight of the hydroxypropyl cellulose is unclear and a solid silica gel is added. Accordingly, an additional test was carried out using a hydroxypropyl cellulose having the same molecular weight as those used in the Examples of the present invention. However, a substrate having sufficient properties as a liquid-absorbing substrate was not obtained.

Furthermore, Japanese Laid-Open Patent Application No. 7-309972 ("JP '972") describes a biodegradable composition containing hydroxypropyl cellulose and tetraethoxysilane or its hydrolytic polycondensates. The composition described in JP '972 is intended to be utilized for, for example, surface material of capsules for agrichemicals, fertilizer or the like and is not intended to be used as a water-absorbing substrate. In the document, the molecular weight of the hydroxypropyl cellulose is unclear. According to the Examples, tetraethoxysilane heated and hydrolyzed in the presence of water is used. Therefore, an additional test was carried out using hydroxypropyl cellulose having the same molecular weight as those used in the Examples of the present invention. However, a substrate having sufficient properties as a liquid-absorbing substrate was not obtained.

Furthermore, POLYMER, Volume 35, No. 25, 1994, pp. 5565-5570 describes production of a complex of hydroxypropyl cellulose and silica by adding water and hydrochloric acid to hydroxypropyl cellulose having a weight-average molecular weight of 60 thousand and tetraethoxysilane and hydrolyzing and polycondensing the tetraethoxysilane. A substrate having sufficient properties as a liquid-absorbing substrate was not obtained from an additional test of this method.

SUMMARY OF THE INVENTION

It is an object of the present invention to provide a more practical liquid-absorbing substrate capable of absorbing not only water but also alcohols, wherein the liquid absorbency and gel properties of the substrate can be easily controlled.

The present inventors have completed the present invention by finding that in a substrate obtained through sol-gel method containing an inorganic oxide and a cellulose derivative, liquid absorption speed and liquid absorption rate can be controlled by regulating the content of the inorganic oxide component and molecular weight of the polymer, and that the substrate can absorb not only water but also alcohols.

Namely, the present invention relates to a liquid-absorbing substrate containing:

(A) a product obtained by hydrolysis and polycondensation of a compound represented by the formula (I)

$(R^1)_n M(X)_{m-n}$        (I)

(wherein $R^1$ represents a hydrogen atom, $C_1$-$C_6$ alkyl or $C_2$-$C_6$ alkenyl; M represents a metal atom; X represents a hydrolysable group; m represents the atomic valence of M; n represents an integer of 0 or 1) in a solvent in the presence of a catalyst; and (B) a cellulose derivative having a mass-average molecular weight of $1 \times 10^5$ to $5 \times 10^6$.

The present invention also relates to the liquid-absorbing substrate described above, wherein M is Si, Ti, Zr, Al, Sn, Ge, W, or Nb.

The present invention further relates to the liquid-absorbing substrate described above, wherein X is hydroxyl or alkoxyl.

The present invention further relates to the liquid-absorbing substrate described above, wherein the compound represented by the formula (I) is a compound represented by the formula (II)

$Si(OR^2)_4$        (II)

(wherein $R^2$ represents $C_1$-$C_6$ alkyl or $C_2$-$C_6$ alkenyl)

The present invention further relates to the liquid-absorbing substrate described above, wherein the cellulose derivative is a hydroxyalkyl cellulose.

The present invention further relates to the liquid-absorbing substrate described above, wherein the hydroxyalkyl cellulose is a hydroxypropyl cellulose.

The present invention further relates to the liquid-absorbing substrate described above, wherein the catalyst is an inorganic acid or an acidic compound.

The present invention further relates to a method for producing the liquid-absorbing substrate described above, having the steps of hydrolyzing and polycondensing a compound represented by the formula (I)

$(R^1)_n M(X)_{m-n}$     (I)

(wherein $R^1$, M, X, m and n are the same as defined above) in a solvent in the presence of a catalyst, and mixing the obtained solution and a cellulose derivative.

The present invention further relates to a liquid-absorbing film or sheet containing the liquid-absorbing substrate described above.

Herein, the liquid-absorbing substrate according to the present invention refers to, for example, a substrate wherein, when a film is prepared through a known procedure (such as casting method) using a reaction liquid obtained by sol-gel method and the solvent is volatilized at room temperature until the film becomes non-sticky, and then dried at a temperature of 60° C. or more for 24 hours or more until no mass change occurs, the film shows a water absorption rate of 60% or more, preferably 80% or more, more preferably 100% or more, even more preferably 120% or more, and most preferably 140% or more when immersed in water for 30 minutes, and the film, when dried as described above and immersed in ethanol for 30 minutes, also shows a liquid absorption rate of 30% or more, preferably 40% or more, more preferably 50% or more, even preferably 60% or more, and most preferably 70% or more.

DETAILED DESCRIPTION OF THE INVENTION

Liquid-Absorbing Base

The liquid-absorbing substrate of the present invention is those obtained through the steps of, producing a solution containing a product obtained by hydrolysis and polycondensation of a compound represented by the formula (I) above in a solvent in the presence of a catalyst, and a cellulose derivative having a mass-average molecular weight of from $1 \times 10^5$ to $5 \times 10^6$, and evaporating the obtained solution to remove the solvent, etc.

In the present invention, a product obtained by hydrolysis and polycondensation of a compound represented by the formula (I) in a solvent in the presence of a catalyst, refers to an inorganic high molecular compound containing a network structure of metal and oxygen obtained by hydrolysis reaction and subsequent polycondensation reaction of a compound represented by the formula (I), which reaction is called the sol-gel method. It is a feature of the present invention that the produced inorganic polymer is used while remaining dissolved in the solvent without being taken out in a solid form after the production.

Furthermore, the expression "containing a product obtained by hydrolysis and polycondensation of a compound represented by the formula (I), in a solvent in the presence of a catalyst, and a cellulose derivative" herein, or the expression "comprising a product obtained by hydrolysis and polycondensation of a compound represented by the formula (I), in a solvent in the presence of a catalyst, and a cellulose derivative" in a claim, encompasses not only a mixture of a product obtained by hydrolysis and polycondensation of a compound represented by the formula (I) in a solvent in the presence of a catalyst, and a cellulose derivative, but also a homogeneous mixture or composite mixture in which a part or the whole of the both components are hydrogen bonded and/or covalently bonded.

(Compound Represented by Formula (I))

In the formula (I), $R^1$ represents a hydrogen atom, $C_1$-$C_6$ alkyl or $C_2$-$C_6$ alkenyl. Specifically, examples of $C_1$-$C_6$ alkyl include methyl, ethyl, n-propyl, isopropyl, n-butyl, sec-butyl, t-butyl, n-pentyl, n-hexyl; and examples of $C_2$-$C_6$ alkenyl include vinyl and allyl. Among these, $C_1$-$C_4$ alkyl and $C_2$-$C_4$ alkenyl are preferred, and particularly preferred is $C_1$-$C_4$ alkyl such as methyl, ethyl, n-propyl, isopropyl, n-butyl, sec-butyl, and t-butyl.

In the formula (I), M represents a metal atom, X represents a hydrolyzable group, and m represents the atomic valence of M. M includes, for example, Si, Ti, Zr, Al, Sn, Ge, W, and Nb. Among these, from the standpoint of achieving a more excellent liquid-absorbing substrate, Si, Ti and Zr are preferred and Si is particularly preferred. In addition, examples of X include hydroxyl and alkoxyl ($OR^3$). Among these, from the standpoint of achieving a more excellent liquid-absorbing substrate, alkoxyl is preferred.

Examples of alkyl ($R^3$) in the hydrolyzable group of alkoxyl ($OR^3$) include, but are not limited to, $C_1$-$C_6$ alkyl and $C_2$-$C_6$ alkenyl. The same as the above $R^1$ can be specifically exemplified.

In the formula (I), n represents an integer of 0 or 1. Among these, from the standpoint of achieving a more excellent liquid-absorbing substrate, 0 is preferred.

Among the compounds represented by the formula (I), preferred examples of the compound specifically include: tetraalkoxysilane such as tetramethoxysilane, tetraethoxysilane, tetrapropoxysilane, tetrabutoxysilane, tetraisopropoxysilane and tetra-t-butoxysilane; trialkoxysilane such as methyltrimethoxysilane, methyltriethoxysilane, methyltriisopropoxysilane, methyltri-t-butoxysilane, ethyltrimethoxysilane, ethyltriethoxysilane, ethyltriisopropoxysilane, n-propyltrimethoxysilane, n-propyltriethoxysilane, n-butyltrimethoxysilane, n-butyltriethoxysilane, n-pentyltrimethoxysilane, n-pentyltriethoxysilane, n-hexyltrimethoxysilane and n-hexyltriethoxysilane; and compounds whose silicon is replaced with titanium, zirconium or the like in the above-mentioned silane compounds such as tetramethoxytitanium, tetraethoxytitanium, tetramethoxyzirconium and tetraethoxyzirconium. Among these, tetraethoxysilane, methyltriethoxysilane, and tetramethoxysilane are particularly preferred. One of the compound (I) may be used singly, or two or more of the compound (I) may be used in combination. Furthermore, oligomeric silicon compounds such as silicate 40, silicate 45, silicate 48, M silicate 51 (Tama Chemicals Co., Ltd.), which are partial condensates of above-exemplified compound (I), may also be used.

(Cellulose Derivative)

Cellulose derivatives are not limited as long as they can be used for a liquid-absorbing substrate of the present invention, and specifically include: an alkyl cellulose such as methyl cellulose and ethyl cellulose; and a hydroxyalkyl cellulose such as hydroxypropyl methylcellulose and hydroxyethyl cellulose. From the standpoint of achieving a more excellent liquid-absorbing substrate, hydroxyalkyl cellulose is preferred, and hydroxypropyl cellulose is particularly preferred.

One cellulose derivative may be used singly, or two or more of the cellulose derivatives may be used.

The mass-average molecular weight of the cellulose derivative used in the present invention is from $1 \times 10^5$ to $5 \times 10^6$, and preferably $5 \times 10^5$ to $1.5 \times 10^6$. Increase in the mass-average molecular weight of the cellulose derivative used is likely to decrease the liquid absorption rate of the obtained liquid-absorbing substrate and improve its shape stability. Therefore, the liquid absorption rate and gel properties of the obtained liquid-absorbing substrate can be easily controlled by adjusting the mass-average molecular weight of the cellulose derivatives used. In the present invention, two cellulose derivatives of different molecular weights can be blended for adjustment to obtain the above average molecular weight. For example, the present invention of course encompasses a case where a hydroxypropyl cellulose having an average molecular weight of 600 thousand and one having an average molecular weight of 1.20 million are used in combination. In addition to that, also encompassed is a case where a hydroxypropyl cellulose having an average molecular weight of 1.20 million and one having an average molecular weight of 70 thousand are used in combination, which makes the average of the molecular weight within the range of $1 \times 10^5$ to $5 \times 10^6$.

The mass-average molecular weight and the molecular weight distribution of cellulose derivatives can be measured using, for example, gel permeation chromatography, which enables calculation of the mass-average molecular weight. Here, methods and conditions for measuring the average molecular weight and the molecular weight distribution of cellulose derivatives required to calculate the mass-average molecular weight value in the present specification comply with known methods and conditions.

In the liquid-absorbing substrate of the present invention, the content ratio of each of a product obtained by hydrolysis and polycondensation of a compound represented by the formula (I) in a solvent in the presence of a catalyst and a cellulose derivative is not particularly limited. Specifically, however, from the standpoint of achieving a more excellent liquid-absorbing substrate, theoretical mass equivalent to the metal oxide of a compound represented by the formula (I) is preferably 1 to 50 parts by mass, more preferably 5 to 30 parts by mass, per 100 parts by mass of the total amount of theoretical mass equivalent to the metal oxide of a compound represented by the formula (I) and a cellulose derivative. When the ratio of a product obtained from a compound represented by the formula (I) is too high, water absorbency of the liquid-absorbing substrate may decrease, while when the ratio of a product obtained from a compound represented by the formula (I) is too low, water resistance of the obtained liquid-absorbing substrate may be insufficient.

Herein, theoretical mass equivalent to the metal oxide of a compound represented by the formula (I) means a mass of a compound represented by the formula (I) wherein all of the X, which is a hydrolyzable group, are theoretically hydrolyzed so that the compound becomes the oxide. Namely, for example, when a compound represented by the formula (I) is $Si(OR^3)_4$, its theoretical mass equivalent to the metal oxide means the mass of $SiO_2$. Alternatively, when a compound represented by the formula (I) is $R^1Si(OR^3)_3$, its theoretical mass equivalent to the metal oxide means the mass of $R^1SiO_{1.5}$.

(Method for Producing a Liquid-Absorbing Base)

The following can be exemplified as examples of a method for producing a liquid-absorbing substrate of the present invention.

One is a method having the step of performing a reaction by adding water and a catalyst to a solution containing a compound represented by the formula (I) and a cellulose derivative while the solution is being stirred. Here, when the solvent is water, dropping of water is not necessary.

Another is a method having the step of homogenizing a solution containing a product obtained by hydrolysis and polycondensation of a compound represented by the formula (I) and a cellulose derivative by stirring.

Specifically, as to the first method above, for example, the reaction can be performed by simultaneously adding a compound represented by the formula (I) and a cellulose derivative into the solvent and then adding water and a catalyst to the solution being stirred. When the solvent is water, only stirring the solution is enough.

As to the second method above, the homogenization can be performed by hydrolysis and polycondensation of a compound represented by the formula (I) through sol-gel method, subsequently adding a cellulose derivative and then stirring the solution.

Preferably, the reaction temperature is from room temperature to reflux conditions, and more preferably from room temperature to 80° C. Preferably, the reaction time is from several dozens of minutes to several dozens of hours, and more preferably several hours to several dozens of hours.

A method for stirring is not particularly limited and may be a conventional method, while methods usable under high viscosity, e.g., homomixer and kneader, are desirable. Furthermore, when air bubbles are contained in the solution after stirring, it is desirable to remove the air bubbles by a method such as centrifugation, ultrasonic wave, or vacuum pressure.

For a solvent other than water, the amount of water added when hydrolyzing a compound represented by the formula (I) is not particularly limited. From the standpoint of achieving a more excellent liquid-absorbing substrate, however, the amount is preferably 1 to 20 times moles, more preferably 2 to 10 times moles, of a compound represented by the formula (I).

Examples of a solvent include water, alcohols (e.g., methanol, ethanol, propyl alcohol, ethylene glycol, diethylene glycol, propylene glycol, dipropylene glycol, ethylene glycol monomethyl ether, propylene glycol monomethyl ether, and ethylene glycolmonoethyl ether), ethers (e.g., tetrahydrofuran, ethylene glycol dimethyl ether, propylene glycol dimethyl ether, and tetrahydropyran), ketones (e.g., acetone, methyl ethyl ketone, and acetylacetone), esters (e.g., methyl acetate and ethylene glycol monoacetate), and amides (e.g., formamide, N-methylformamide, pyrrolidone, and N-methylpyrrolidone). One of these may be used singly or two or more of these may be used in combination.

Examples of a catalyst for hydrolysis of a compound represented by the formula (I) include: alkali metal salts such as naphthenates, octylates, nitrites, sulfites, aluminates, and carbonates; alkaline compounds such as sodium hydroxide, potassium hydroxide, and ammonia; acidic compounds such as alkyl titanate, p-toluenesulfonic acid, phthalic acid, acetic acid, formic acid, oxalic acid, and citric acid; amine compounds such as ethylenediamine, hexanediamine, diethylenetriamine, triethylenetetramine, tetraethylenepentamine, piperidine, piperazine, meta phenylene diamine, ethanolamine, and triethylamine; organotin compounds such as $(C_4H_9)_2Sn(OCOC_{11}H_{23})_2$, $(C_4H_9)_2Sn(OCOCH=CHCOOCH_3)_2$, $(C_4H_9)_2Sn(OCOCH=CHCOOC_4H_9)_2$, $(C_8H_{17})_2Sn(OCOC_{11}H_{23})_2$, $(C_8H_{17})_2Sn(OCOCH=CHCOOCH_3)_2$, $(C_8H_{17})_2Sn(OCOCH=CHCOOC_4H_9)_2$, $(C_8H_{17})_2Sn(OCOCH=CHCOOC_8H_{17})_2$, $Sn(OCOCC_8H_{17})_2$, $(C_4H_9)_2Sn(SCH_2COO)$, $(C_4H_9)_2Sn(SCH_2COOC_8H_{17})_2$, $(C_8H_{17})_2$ Sn(SCH$_2$COO), (C$_8$H$_{17}$)$_2$Sn(SCH$_2$CH$_2$COO) (C$_8$H$_{17}$)$_2$Sn (SCH$_2$COOCH$_2$CH$_2$OCOCH$_2$S), (C$_8$H$_{17}$)$_2$Sn (SCH$_2$COOCH$_2$CH$_2$CH$_2$OCOCH$_2$S), (C$_8$H$_{17}$)$_2$Sn (SCH$_2$COOC$_8$H$_{17}$)$_2$, and (C$_8$H$_{17}$)$_2$Sn(SCH$_2$COOC$_{12}$H$_{25}$)$_2$; organotin compounds containing a reaction product of an organotin oxide such as (C$_4$H$_9$)$_2$SnO, (C$_8$H$_{17}$)$_2$SnO, (C$_4$H$_9$) SnO, and (C$_8$H$_{17}$) SnO, with an ester compound such as ethyl silicate, ethyl silicate 40, dimethyl maleate, diethyl maleate, and dioctyl phthalate; inorganic acids such as hydrochloric acid, nitric acid, and phosphoric acid; metal alcoholates such as tetraethoxyzirconium, tetra-n-propoxyzirconium, tetra-i-propoxyzirconium, tetra-n-butoxyzirconium, tetra-sec-butoxyzirconium, tetra-t-butoxyzirconium, tetra-n-pentoxyzirconium, tetra-i-propoxytitanium, tetra-n-butoxytitanium, tetrakis(2-ethylhexyloxy)titanium, tetrastearyloxytitanium, triethoxyaluminum, tri-i-propoxyaluminum, mono-sec-butoxy-propoxyaluminum, and tri-sec-butoxyaluminum; chelate compounds such as ethylacetoacetate aluminum diisopropylate, aluminum tris(ethylacetoacetate), aluminum monoacetylacetonate, aluminum bis(ethylacetoacetate), aluminum tris(acetylacetate), cyclic aluminum oxide isopropylate, and di-i-propoxybis(acetylacetonate) titanium; and partial hydrolytic polycondensates from the reaction of the metal alcoholate and chelate compound with water. Among these, inorganic acids such as hydrochloric acid and nitric acid, carboxylic acids such as acetic acid and citric acid, ammonia etc. can be suitably used. An amount of such catalyst supplemented is preferably, from the standpoint of achieving a more excellent liquid-absorbing substrate, 0.001 to 0.5 times moles, more preferably 0.01 to 0.1 times moles, of a compound represented by the formula (I).

The liquid-absorbing substrate of the present invention may be, but is not limited to be, in a form of sheet, particle, powder, fiber or the like, or in a shape of ellipse, circle, rectangle, square, triangle or the like, or in the shape of cube, column, triangular prism, ovoid or the like, and may be in an appropriate form according to its application, usage etc. A method for forming the liquid-absorbing substrate of the present invention is not particularly limited and may be a known method.

Examples of application of the liquid-absorbing substrate of the present invention include, but are not limited to: pet waste treating agents; a liquid-absorbing substrate in hygiene products such as diapers, sanitary products or the like; water retention agents in agricultural/gardening supplies; sheets that contain a medicinal ingredient; desiccants; freshness-keeping agents for foods or the like; and humidity conditioning agents.

The liquid-absorbing substrate of the present invention can absorb not only water but also a hydrophilic organic solvent such as alcohols, ethers, ketones, and amides, and has a sufficient shape stability. Herein, examples of a hydrophilic organic solvent include: alcohols such as methanol, ethanol, n-propanol, isopropanol, n-butanol, ethylene glycol, diethylene glycol, triethylene glycol, propylene glycol, and glycerin; ethers such as tetrahydrofuran, ethylene glycol dimethyl ether, and propylene glycol dimethyl ether; ketones such as acetone and methyl ethyl ketone; and amides such as formamide, N-methylformamide, pyrrolidone, and N-methylpyrrolidone.

Thus, the above-mentioned medicinal ingredients are not particularly limited as long as it is soluble in a hydrophilic organic solvent such as alcohols, ethers, ketones, and amides or soluble in water, and include, for example: anti wrinkles such as retinol; anti-blemishes or skin-lightening agents such as vitamin C and cysteine; moisturizers such as glycerin, hyaluronic acid, collagen, sugars, amino acids, placenta extract, sorbitol, and polyethylene glycol; softeners such as olive oil, cetyl alcohol, lanolin, and stearyl alcohol; blood circulation promoting agents such as vitamin E; anti-inflammatory agents such as glycyrrhizic acid; and topical anesthetics such as lidocaine, mepivacaine, bupivacaine, procaine, tetracaine, chloroprocaine, prilocaine, cocaine, bupivacaine, and dibucaine. In addition, the liquid-absorbing substrate of the present invention containing the above-mentioned medicinal ingredients can be used suitably, for example, in poultices, cosmetic masks, and iontophoresis. Iontophoresis is a technique to promote absorption of medicinal ingredients in transdermal absorption of active ingredients by current loading. Iontophoresis is described in, for example, Japanese Laid-Open Patent Application No. 10-316590, Japanese Laid-Open Patent Application No. 2003-040802, and Japanese Laid-Open Patent Application No. 2001-120669.

The liquid-absorbing substrate of the present invention may contain only a product obtained by hydrolysis and polycondensation of a compound represented by the formula (I) and a cellulose derivative. In addition to these, however, it may contain any component, for example: a metal oxide particulate such as fine particles of silica sol or fine particles of alumina sol; surfactant; a dye or a pigment; a dispersant; a thickener; fragrance; or an antibacterial component.

Furthermore, any other composition may be added to the liquid-absorbing substrate of the present invention according to its application. For example, if the liquid-absorbing substrate of the present invention is made into a sheet containing a medicinal ingredient, the liquid-absorbing substrate of the present invention may be used without being immobilized onto a support, or alternatively may be used being immobilized onto a support. Examples of a support include, but are not limited to: a plastic film such as ethylene-vinyl acetate copolymer, vinyl chloride, polyurethane, and polyester; a nonwoven fabric such as nylon, rayon, urethane, and absorbent cotton; a fabric of natural fiber and chemical fiber; and others such as paper and cellophane.

(Method for Producing a Film or the Like)

The liquid-absorbing substrate of the present invention can be shaped into film, sheet or the like by a method such as casting method. Furthermore, it can be laminated on other substrates. Solid concentration of a reaction liquid (the solid concentration in which a total of a cellulose derivative and theoretical mass of a compound represented by the formula (I) converted to its metal oxide is considered as a solid) is, from the standpoint of obtaining a homogeneous casting film, preferably 1 to 30% by mass, and more preferably 5 to 20% by mass. Although the thickness of the film can be properly adjusted through an amount of solution applied while casting, the thickness is preferably 20 µm or more in order to obtain excellent liquid absorbency and shape stability. Because film drying step also serves to promote hydrolysis reaction and polycondensation reaction of a compound represented by the formula (I), drying temperature is preferably from room temperature to 150° C., more preferably 40° C. to 100° C. Although drying medium is typically air, a method that includes replacement with inert gas such as nitrogen or argon may be used. For this drying, for example, yankee cylinder drying method, counterflow drying method, jet nozzle drying method, air floating drying method, infrared drying method, microwave-induced heating drying method, a drying method using electromagnetic induction heating, extraction drying method using an organic solvent or the like may be used other than drying methods using general heating methods. Furthermore, vacuum drying may be optionally performed. In doing so, initial drying with a temperature ranging from room temperature to 50° C. and subsequent drying with increased temperature is preferably performed. Here, mechanical properties of the obtained film such as liquid absorption rate, strength, and plasticity may be decreased by film forming conditions or drying conditions. As countermeasures in such case, methods to lower the average molecular weight of the entire cellulose derivative (for example, addition of a cellulose derivative having a low molecular weight in a certain ratio) are effective. Furthermore, it is also effective to decrease the content of the product obtained by hydrolysis and polycondensation of a compound represented by the formula (I). In addition, longer reaction time and high speed stirring are also effective to sufficiently homogenize a product obtained by hydrolysis and polycondensation of a compound represented by the formula (I) and a cellulose derivative. Further, also effective is addition of a plasticizer or the like capable of conferring water absorbency or plasticity, which plasticizer is chemically stable under the drying temperature mentioned above. Specific examples include various liquid organic compounds having good compatibility with cellulose derivatives. Examples of such liquid organic compounds include poly alcohols such as ethylene glycol, propylene glycol, polyethylene glycol, and glycerin. Moreover, addition of surfactant is also effective.

Methods for producing a film or sheet applicable to the present invention will be specifically illustrated below.

1) Casting Method (Solution Casting Method)

A solution containing a liquid-absorbing substrate is cast on a continuously running endless support (e.g., belt, drum) or a glass plate support from a die with a uniform film thickness, dried on the support until the film strength for the peeling is obtained, and the formed film is then peeled from the support. Herein, for a support, fluororesin such as Teflon®, a plastic plate such as polyethylene terephthalate, polycarbonate, polyethylene, or polypropylene, or a rubber plate such as silicone rubber or fluoro rubber may be used. When adhesion between a support and film is strict, demolding process may be carried out on the support surface by using a mold release agent that does not cause adhesion to the film.

2) Spin Coating Method

By using a spinner, a solution containing a liquid-absorbing substrate is dropped on a rotating support, which is formed into a uniform film by centrifugal force, which is then dried. Then, the formed film is peeled off from the support.

3) Dipping Method

A support is dipped into a solution containing a liquid-absorbing substrate, then pulled out at a constant speed, and then dried. Then the formed film is peeled off from the support.

4) Others

Wire bar, solution nebulization, blade coating, slide coating, roll coating, gravure coating, doctor blade coating, fountain coating, comma coating, curtain coating and the like used for producing coating membrane or film are applicable.

In addition, general methods used for producing film or sheet such as extrusion processing, calendar processing, laminate forming, and inflation processing can be also used.

The present invention will be now described in detail below with reference to Examples. The technical scope of the present invention is not limited by these exemplifications. Here, mass-average molecular weight of the hydroxypropyl cellulose grades M and H, which are used in the present Examples, are 690 thousand and 1.18 million, respectively. The mass-average molecular weights were determined by GPC using pullulan as a molecular weight preparation.

EXAMPLES

Example 1

2.0 g of hydroxypropyl cellulose (grade M: Nippon Soda Co., Ltd.) was dissolved into 55 g of dehydrated ethanol at room temperature with stirring to prepare a solution of 3.5 mass percent. 0.76 g of tetraethoxysilane (KBE-04: Shin-Etsu Chemical Co., Ltd.) was added to the solution so that the amount of tetraethoxysilane, when converted to the amount of $SiO_2$ after hydrolysis and polycondensation reactions, would become 10% of total solids, and stirred at room temperature to give a homogeneous solution. 0.36 g of 1N HCl was dropped gradually into the solution so that the molar ratio of tetraethoxysilane to hydrochloric acid would become 1:0.1. The solution was stirred for 6 hours at room temperature after the dropping. The obtained solution was cast on a flat dish that had been silane coupling-treated, left for 5 days at room temperature, and then placed between glass plates via Teflon film, and vacuum dried at 60° C. for 72 hours. As a result, an 88 μm-thick organic-inorganic hybrid film containing 10 mass percent (when converted to the amount of $SiO_2$) of Si compounds uniformly dispersed in hydroxypropyl cellulose matrix (a liquid-absorbing substrate of the present invention) was obtained.

Example 2

Operation was carried out in the same manner as in Example 1 except that 1.42 g of tetraethoxysilane was added so that the amount of $SiO_2$ in the resultant film would become 17 mass percent. As a result, a 126 μm-thick organic-inorganic hybrid film containing 17 mass percent (when converted to the amount of $SiO_2$) of Si compounds uniformly dispersed in hydroxypropyl cellulose matrix (a liquid-absorbing substrate of the present invention) was obtained.

Example 3

Operation was carried out in the same manner as in Example 1 except that hydroxypropyl cellulose of grade H was used. As a result, an 81 μm-thick organic-inorganic hybrid film containing 10 weight percent (when converted to the amount of $SiO_2$) of Si compounds uniformly dispersed in hydroxypropyl cellulose matrix (a liquid-absorbing substrate of the present invention) was obtained.

Comparison Example 1

Casting was carried out in the same manner as in Example 1 by using ethanol solution containing hydroxypropyl cellulose (grade H) in 3 mass percent without addition of tetraethoxysilane. As a result, a 125 μm-thick film only containing hydroxypropyl cellulose was obtained.

Comparison Example 2

Operation was carried out in the same manner as in Example 1 except that polyvinyl alcohol (Kuraray Co., Ltd.: Kuraray poval PVA-117) was used instead of hydroxypropyl cellulose and that dissolution was carried out in a mixed solvent of ethanol and water (mass ratio of 2:1) by stirring and heating to 55° C. As a result, a 106 μm-thick organic-inorganic hybrid film containing 10 weight percent (when converted to the amount of $SiO_2$) of Si compounds uniformly dispersed in polyvinyl alcohol matrix was obtained.

Example 4

7.0 g of hydroxypropyl cellulose (grade H: Nippon Soda Co., Ltd.) and 3.5 g of hydroxypropyl cellulose (grade M: Nippon Soda Co., Ltd.) were added to 265 g of ethanol being stirred with a homomixer and dissolved at room temperature with stirring (3.8 mass percent solution). 4.0 g of tetraethoxysilane (KBE-04: Shin-Etsu Chemical Co., Ltd.) was added to the solution so that the amount of tetraethoxysilane, when converted to the amount of $SiO_2$ after hydrolysis and polycondensation reactions, would become 10% of total solids. This mixture was stirred at room temperature to make the solution homogeneous. 3.5 g of 0.2 N-hydrochloric acid was gradually dropped to this solution (molar ratio of tetraethoxysilane:water:hydrochloric acid was 1:10:0.036). After the dropping, reaction was carried out by stirring at 55° C. for 7.5 hours. The viscosity of the solution at 25° C. was measured using a B-type Viscometer to be 18,000 cP. An aliquot of the obtained solution was de-aerated under reduced pressure by using an aspirator and was cast onto a 1 mm-thick silicon sheet overlaid on a glass plate by using an automatic coating machine (Tester Sangyo Co., Ltd.) equipped with a film applicator attached with a 15-cm wide micrometer (Sheen Instruments). Drying was carried out at room temperature until the film surface became non-sticky and then vacuum drying was performed at 60° C. for 15 hours to promote sol-gel reaction. An 80 μm-thick organic-inorganic hybrid film containing Si compounds uniformly dispersed in hydroxypropyl cellulose matrix was obtained. The resultant film contained only a few bubbles and had a sufficient strength to be used as a self-support film.

The water absorption rate of the film was 293% 1 hour later. 24 hours later, the film expanded to 1007% but retained its sheet shape without being dissolved or collapsed.

Example 5

Casting of film was performed by the same operation as in Example 4 except that the reaction mixture was prepared under stirring conditions of 50° C. for 13.5 hours. The water absorption rate of the resultant 70 μm organic-inorganic hybrid film 1 hour later was 475%. The water absorption rate of the film was improved by performing heating and stirring for a longer time in the sol-gel reaction.

Example 6

6.0 g of tetraethoxysilane (KBE-04: Shin-Etsu Chemical Co., Ltd.) was added to 26 g of ethanol, and 2.6 g of 0.2 N-hydrochloric acid was dropped therein (the molar ratio of tetraethoxysilane:water:hydrochloric acid was 1:5:0.02). Silica sol solution was prepared by performing the reaction at room temperature for 25 hours with stirring. This silica sol solution was added to 34 g of ethanol solution containing 2 g of hydroxypropyl cellulose (grade M: Nippon Soda Co., Ltd.), which was stirred at 45° C. for 22 hours, and then the resultant was subjected to the same casting operation as in Example 4. As a result, a 70 μm-thick organic-inorganic hybrid film containing $SiO_2$ uniformly dispersed in hydroxypropyl cellulose matrix was obtained ($SiO_2$ was 10 mass percent in solids). The water absorption rate of this film after 1 hour was 196%. Even after 24 hours, swelling occurred only up to 431% and water absorption speed was controllable.

Comparison Example 3

Casting operation was carried out in the same manner as in Example 4 except that 6.2 g of colloidal silica from Nissan Chemical Industries, Ltd. (SNOWTEX-O; $SiO_2$ solids concentration of 20%) was used as an $SiO_2$ source, and that mixing and dispersing were carried out at room temperature for 24 hours with stirring. As a result, a 90 μm-thick film, in which $SiO_2$ content in solids was 10 mass percent, was obtained. The strength of this film was weak and, when immersed in water, the film collapsed when pulled up for measurement of water absorption rate.

Comparison Example 4

Sol-gel reaction and casting operation were carried out in the same manner as in Example 4 except that polyvinylpyrrolidone K-90 (Wako Pure Chemical Industries, Ltd., average molecular weight: 340,000) was used instead of hydroxypropyl cellulose to prepare 5 mass percent of ethanol solution. As a result, a 100 μm-thick organic-inorganic hybrid film containing 10 mass percent (when converted to the amount of $SiO_2$) of Si compounds uniformly dispersed in polyvinylpyrrolidone matrix was obtained. When immersed in water, the film started to dissolve immediately after the immersion.

(Water Absorbency Test)

The films obtained in Examples 1 to 3 and Comparison Examples 1 to 2 were each cut into a 2.5 cm×2.5 cm square, immersed in pure water for a given time, and pulled up. Extra water on the surface was then absorbed in a Kimwipe, and then the mass of each film (test sample) was weighed precisely.

Water absorption rate was calculated using the following equation:

Water absorption rate=(mass of the test sample after water absorption−mass of the test sample before water absorption)×100/(mass of the test sample before water absorption)(g/g)

Table 1 shows water-absorption rate (%) of each test sample 1 hour or 3 hours after the immersion. In addition, Table 1 also shows the appearance of each test sample 3 hours after the immersion.

TABLE 1

| Test Sample | 1 hour after | 3 hours after | Appearance |
| --- | --- | --- | --- |
| Example 1 | 501 | 506 | swollen slightly sideward |
| Example 2 | 158 | 221 | shape retained |
| Example 3 | 257 | 284 | shape retained |
| Comparison Example 1 | — | — | dissolved |
| Comparison Example 2 | 131 | 131 | shape retained |

The results in Table 1 show that the liquid-absorbing substrates of the present invention (Examples 1 to 3) have superior water absorbency to the film containing polyvinyl alcohol and $SiO_2$ (Comparison Example 2). Further, the comparison of results of Example 1 and Example 2 shown in Table 1 reveals that increase in the content of the product obtained by hydrolysis and polycondensation of a compound represented by the formula (I) in a film tends to decrease the water absorption rate and increase shape stability. Furthermore, the comparison of the results of Example 1 and Example 3 shown in Table 1 reveals that increase in molecular weight of cellulose derivative used tends to decrease the water absorption rate and increase shape stability. On the other hand, the film of Comparison Example 1, which does not contain the hydrolysates of a compound represented by the formula (I), was dissolved in water and its water absorption rate could not be measured.

(Liquid Absorbency Test)

Liquid absorbency test was carried out in the same manner as the water absorbency test above except that ethanol was used instead of pure water. Liquid absorption rate for ethanol was calculated similarly to water absorption rate.

Table 2 shows liquid absorption rate (%) of each test sample after 1 hour and 3 hours of immersion in ethanol. In addition, Table 2 also shows the appearance of each test sample after 3 hours of immersion in ethanol.

TABLE 2

| Test Sample | 1 hour after | 3 hours after | Appearance |
|---|---|---|---|
| Example 1 | 326 | 335 | Swollen slightly sideward |
| Example 2 | 78 | 78 | Shape Retained |
| Example 3 | 128 | 145 | Shape Retained |
| Comparison Example 1 | — | — | Dissolved |
| Comparison Example 2 | 0 | 0 | Shape Retained |

The results in Table 2 show that the liquid-absorbing substrates of the present invention (Examples 1 to 3) also absorb ethanol while the film containing polyvinyl alcohol and $SiO_2$ (Comparison Example 2) does not absorb ethanol. Further, comparison of the results of Example 1 and Example 2 shows that increase in the content of the hydrolytic polycondensates of a compound represented by the formula (I) in a film tends to decrease the liquid absorption rate and improve shape stability. Comparison of the results of Example 1 and Example 3 shown in Table 2 reveals that increase in the molecular weight of cellulose derivative used tends to decrease liquid absorption rate and improve shape stability. On the other hand, the film of Comparison Example 1, which does not contain the hydrolysates of a compound represented by the formula (I), was dissolved in ethanol and its liquid absorption rate could not be measured.

A liquid-absorbing substrate of the present invention has an excellent liquid absorbency, shape stability, elasticity, and adhesion. Furthermore, liquid absorbency and gel properties of a liquid-absorbing substrate of the present invention can be easily controlled.

Therefore, according to its application, a liquid-absorbing substrate having appropriate liquid absorbency and properties can be obtained. Further, as described in the Examples above, while hydrogels using a hybrid of polyvinyl alcohol and $SiO_2$ do not absorb alcohols, the liquid-absorbing substrates of the present invention can absorb hydrophilic organic solvents such as alcohols, ethers, ketones, and amides as well. Therefore, even hydrophobic drugs and the like can be used in a drug sheet by making them absorbed in a liquid-absorbing substrate of the present invention as long as the drugs and the like are soluble to a hydrophilic organic solvent that can be absorbed by a liquid-absorbing substrate of the present invention. Furthermore, the liquid-absorbing substrate of the present invention can be recycled or the like, since it reabsorbs liquid and reswells after having been dried following liquid absorption and swelling.

The invention claimed is:

1. A liquid-absorbing substrate comprising:
    a product obtained by hydrolysis and polycondensation of a compound represented by formula (I)

$$(R^1)_n M(X)_{m-n} \qquad (I)$$

wherein:
    $R^1$ represents a hydrogen atom, $C_1$-$C_6$ alkyl, or $C_2$-$C_6$ alkenyl;
    M represents a metal atom;
    X represents a hydrolysable group;
    m represents the atomic valence of M; and
    n represents an integer of 0 or 1;
    in a solvent in the presence of a catalyst; and
    a hydroxyalkyl cellulose derivative having a mass-average molecular weight of $1 \times 10^5$ to $5 \times 10^6$.

2. The liquid-absorbing substrate according to claim 1, wherein M is Si, Ti, Zr, Al, Sn, Ge, W, or Nb.

3. The liquid-absorbing substrate according to claim 1, wherein X is hydroxyl or alkoxyl.

4. The liquid-absorbing substrate according to claim 1, wherein the compound represented by formula (I) is a compound represented by formula (II)

$$Si(OR^2)_4 \qquad (II)$$

wherein $R^2$ represents $C_1$-$C_6$ alkyl or $C_2$-$C_6$ alkenyl.

5. The liquid-absorbing substrate according to claim 1, wherein the hydroxyalkyl cellulose is a hydroxypropyl cellulose.

6. The liquid-absorbing substrate according to claim 1, wherein the catalyst is an inorganic acid or an acidic compound.

7. A method for producing the liquid-absorbing substrate according to claim 1, comprising the steps of:
    hydrolyzing and polycondensing a compound represented by formula (I)

$$(R^1)_n M(X)_{m-n} \qquad (I)$$

wherein $R^1$, M, X, m, and n are the same as defined in claim 1, in a solvent in the presence of a catalyst; and
    mixing the obtained solution and a cellulose derivative.

8. A liquid-absorbing film or sheet comprising the liquid-absorbing substrate according to claim 1.

9. The liquid-absorbing substrate according to claim 1, wherein the hydroxyalkyl cellulose derivative has a mass-average molecular weight of $5 \times 10^5$ to $1.5 \times 10^6$.

* * * * *